United States Patent
Kenney

(10) Patent No.: US 7,703,682 B2
(45) Date of Patent: Apr. 27, 2010

(54) COMPUTER OPERATION CONTROL AND ITEM SELECTION AND VENDING METHODS AND SYSTEMS

(76) Inventor: John A. Kenney, 140 Lake Aluma Dr., Oklahoma City, OK (US) 73121

( * ) Notice: Subject to any disclaimer, the term of this patent is extended or adjusted under 35 U.S.C. 154(b) by 0 days.

(21) Appl. No.: 12/362,692

(22) Filed: Jan. 30, 2009

(65) Prior Publication Data

US 2009/0138382 A1    May 28, 2009

Related U.S. Application Data

(60) Continuation of application No. 11/598,373, filed on Nov. 13, 2006, now Pat. No. 7,503,496, which is a division of application No. 10/127,514, filed on Apr. 22, 2002, now Pat. No. 7,156,306.

(51) Int. Cl.
*G06K 7/10* (2006.01)
(52) U.S. Cl. .................................... 235/462.01; 705/26
(58) Field of Classification Search ............ 235/462.01; 705/26, 27
See application file for complete search history.

(56) References Cited

U.S. PATENT DOCUMENTS

| 5,808,614 A * | 9/1998 | Nagahara et al. ............. 715/848 |
| 5,960,411 A * | 9/1999 | Hartman et al. ................ 705/26 |
| 6,154,738 A * | 11/2000 | Call ............................... 707/4 |
| 2002/0023027 A1* | 2/2002 | Simonds ....................... 705/26 |
| 2005/0004844 A1* | 1/2005 | Attia ............................ 705/26 |

* cited by examiner

Primary Examiner—Daniel A Hess
(74) Attorney, Agent, or Firm—McAfee & Taft

(57) ABSTRACT

A signal is transmitted into a computer in response to an image on a display screen of the computer such that the computer operates in response to the signal; this includes moving a scanner in optical communication with the display screen such that the scanner detects an image (for example, a bar code) displayed on the screen and generates the signal in response. One or more computers may be used, and this may be used for vending a product or other purposes. With or without such scanning, a portion of a store environment may be displayed on a screen of a computer, including showing images of actual products for sale at the store, in which images of actual products are accessed via the computer from a database containing in-store images recorded in the store during a period of non-existent or minimal customer presence in the store. A vending system is also disclosed.

12 Claims, 3 Drawing Sheets

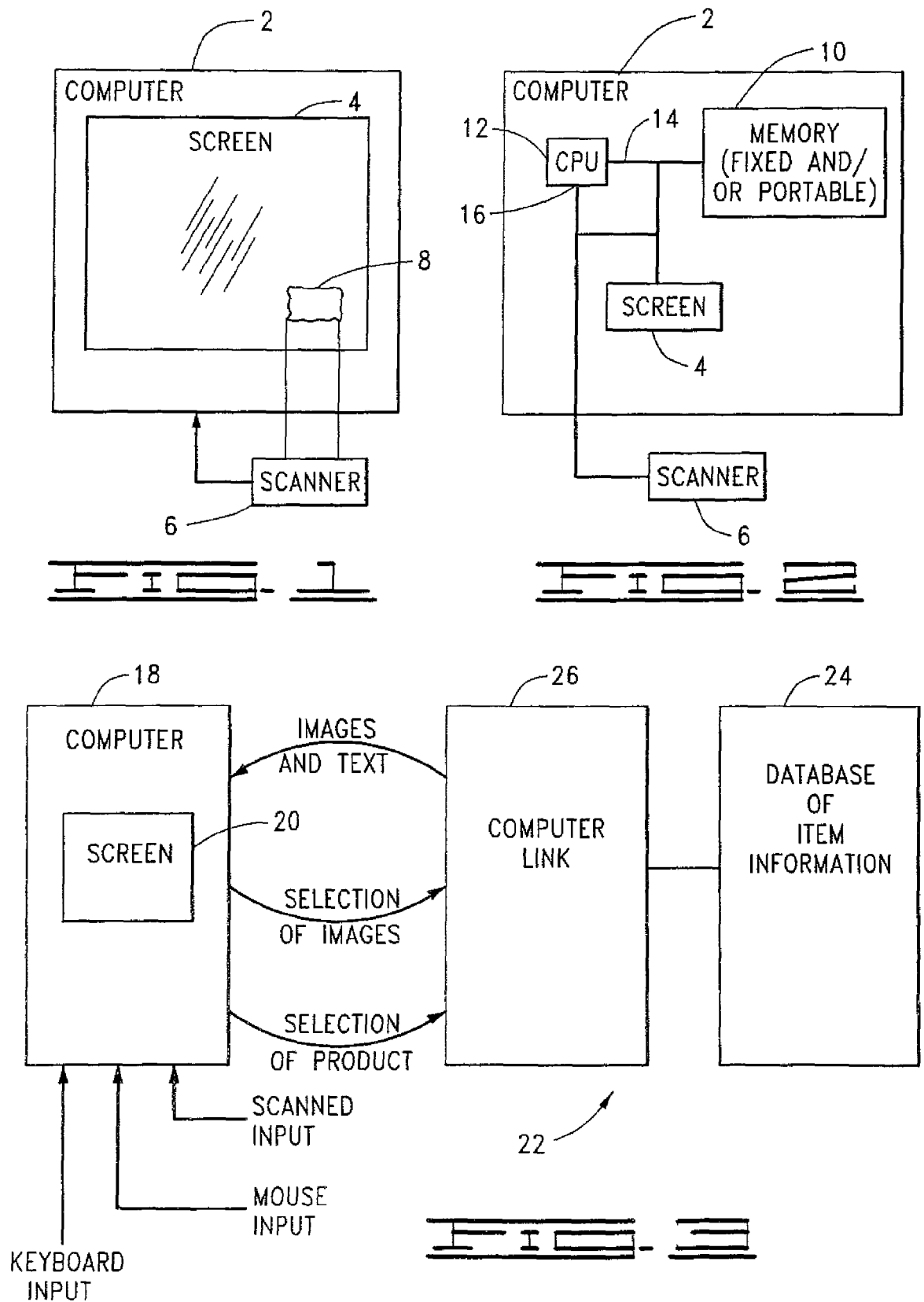

COMPUTER OPERATION CONTROL AND ITEM SELECTION AND VENDING METHODS AND SYSTEMS

CROSS-REFERENCE TO RELATED APPLICATION

This application is continuation of U.S. patent application Ser. No. 11/598,373 filed Nov. 13, 2006, now U.S. Pat. No. 7,503,496 which is a divisional of U.S. patent application Ser. No. 10/127,514 filed Apr. 22, 2002, now U.S. Pat. No. 7,156,306 issued Jan. 2, 2007.

BACKGROUND OF THE INVENTION

This invention relates in part to computer-implemented shopping via a computer network, such as the Internet. An aspect of this that can be applied in other contexts is a computer operation control method that includes moving a scanner in optical communication with a computer screen such that the scanner detects indicia displayed on the screen and generates a signal in response. A particular application of the present invention uses computer screen bar code scanning with a product vendor's pre-existing database of product and bar code information.

Computer communication networks, today primarily the Internet with regard to global access, have facilitated the exchange of information and created new marketplaces. There have been many on-line retail businesses trying to sell products to on-line shoppers; however, at least some of these on-line retail businesses have failed to prosper or survive. Various reasons may account for these difficulties, but one may be a failure to make the on-line shopping experience easy or comfortable enough for the customer, whereby such businesses have failed to attract enough customers or enough sales volume to survive. Another reason may be that establishing the business's on-line facility has not been sufficiently integrated with the vendor's pre-existing "brick and mortar" facility.

Many prior on-line vending sites have been list-driven so that a shopper must read through lists of words describing the goods being marketed. This presents a different shopping experience than the highly non-textual one a customer has come to use when going to actual "brick-and-mortar" stores. For example, a customer may recognize a particular product by its packaging but not remember the specific brand name or the species ("Was that 'original' style I bought last time, or the 'modified' style? I don't remember that, but I'll recognize it when I see it."). Another factor of this "appearance" or "image" type of shopping is the product placement within the physical store environment ("I don't remember what it was exactly, but it was in this part of the store next to the widgets.") To accommodate such non-textual visual shopping techniques, on-line shopping needs to show actual product images in their actual store configurations (or at least substantially so).

Some on-line marketing sites may also be less than ideal for the vendors. Whereas creating and maintaining an on-line vending environment can result in an essentially independent entity from the vendor's existing business, it would be more efficient to build on pre-existing parts of the pre-existing business in creating the on-line part of the business. That is, there should be convergence rather than divergence between the tradition business and the new on-line business. Such convergence preferably can reduce at least some computer programming complexity. One way to facilitate such convergence is to visually replicate on-line the store appearance to enhance or create customer identification with a vendor's physical brick-and-mortar store. Such on-line convergence should preferably interface with the vendor's pre-existing operating system. For example, many vendors manage inventory through the use of bar code scanning as is well known. When a customer at a physical store location selects an item and takes it to a checkout counter, the cashier scans a bar code on the product or its packaging. This enters the transaction in the cash register, and it also is used by the vendor's background inventory management system. It would be desirable to incorporate a bar code (or other) scanning operation in on-line sales transactions for use in the same manner and with the same pre-existing vendor system as used for the physical store and inventory.

In view of the foregoing shortcomings, there is the need for an improved computer operation control method that can be applied at least to on-line vending transactions. There is the need for a product selection communication method such as may be used in selling products over a computer network, such as the Internet. There is also the need for an improved method and system for selling or ordering items via a computer system.

SUMMARY OF THE INVENTION

The present invention meets at least some of the aforementioned needs by providing novel and improved computer operation control methods, item selection and communication methods, product vending and ordering methods, and related vending systems.

One advantageous feature of the present invention is that it provides for bar code or other indicia scanning directly from a computer screen. In at least some applications, the present invention may reduce or eliminate the need for computer programming used to provide "hot spotting" of screen images or locations that enable mouse pointing and clicking, which actions are replaced at least in part by the scanning feature of the present invention. The present invention may help converge an on-line business with a pre-existing business by enabling on-line use of pre-existing databases keyed or linked to the scanned indicia (for example, bar codes). Interfacing with existing inventory databases may speed data access and reduce programming costs. It may reduce start up costs by using other existing facilities or data, such as for stores in which bar codes are displayed with products on shelves.

In a particular implementation, the present invention provides on-line product images in visually replicated real store environments so that customers can use their accustomed visual shopping skills instead of mere textual list shopping. Product images may include the indicia used as the code to be read in using the present invention. This may facilitate a customer's on-line shopping experience and a vendor's deployment and maintenance of its on-line site. This also may provide ease of product selection by visual search and quick access to more information and selection for inclusion in a "shopping cart" or list.

Although the invention is described in part by reference to on-line use and for product vending, the invention has other applications as well. One non-limiting example includes on-line access to product or other information.

One definition of the present invention is as a computer operation control method comprising transmitting into a computer a signal in response to an image on a display screen of the computer such that the computer operates in response to the signal. This includes moving a scanner in optical communication with a computer screen such that the scanner detects an image displayed on the screen and generates the signal in response thereto. In one implementation, the image includes a bar code image and moving a scanner includes using a bar code scanner to scan the bar code image. As another example, the image includes an alphanumeric character and moving a scanner includes using an optical character recognition scanner to scan the alphanumeric character. As a further example, the image includes a graphic element and moving a scanner includes using an optical scanner to scan the graphic element.

The present invention may also be defined in various ways as an item selection communication method. One of these is as a method of selecting an item using a personal computer, comprising: accessing through operation of a personal computer, at the request of a user of the personal computer, a database of item information; displaying, through a screen of the personal computer, in response to the accessed database, information for at least one item, including at least one scannable selector image; and moving a scanner adjacent the screen to optically scan the displayed selector image, generating a signal in response thereto and communicating the signal to the personal computer, thereby selecting the corresponding item. In one implementation, accessing a database includes: going via a web browser program stored in the personal computer to a predetermined website on the Internet, the website communicating with the database of item information; and downloading to the personal computer, via the Internet, from the database of item information, the information for displaying through a screen of the personal computer. This may also comprise sending, in response to the signal generated in response to moving the scanner and communicated to the personal computer, a communication via the Internet to the website to order the selected item. In another implementation, accessing a database includes using a local storage device in the personal computer containing the database of item information.

The present invention has particular use as, but is not limited to, a product vending method, comprising: displaying on a screen of a computer a portion of a store environment, including showing images of actual products for sale at the store and showing scannable images respectively associated with the products; changing the portion of the store environment displayed on the screen until an image of an actual product to be selected and the respective scannable image are shown on the screen; optically scanning the scannable image shown on the screen to generate a signal in response thereto; and communicating the signal to the computer.

Another example of the present invention is as a method of placing an order for an item, comprising: under control of a client system, displaying on a computer of the client system information identifying the item, and sending a request to order the item, including scanning a bar code image displayed on the computer of the client system, wherein the bar code image is related to the item; and under control of a server system, receiving the request, and generating an order to purchase the requested item. In one particular implementation, the bar code image has a width of at least about 4.6 centimeters and a height of at least about 1.1 centimeters. In another particular implementation, but again not limiting of broader aspects of the invention, the bar code image has a width of at least about 1.6 centimeters and a height of at least about 0.5 centimeter.

Still another aspect of the present invention, whether with the scanning feature or not, is the rendition of the in-store environment. This can be either real time/live or pre-recorded. Even if pre-recorded, however, the rendition is preferably substantially the same as the real-time appearance of the store existing at the time a user is seeing the store image displayed on his or her computer. Accordingly, the present invention also provides a product vending method, comprising displaying on a screen of a computer a portion of a store environment, including showing images of actual products for sale at the store, wherein showing images of actual products includes accessing via the computer a database containing in-store images recorded in the store during a period of non-existent or minimal customer presence in the store. The present invention also provides a method as just described and wherein the period of non-existent or minimal customer presence in the store is also one in which a product layout configuration in the store is substantially the same as the corresponding actual product layout configuration existing in the store at the time of the displaying.

The present invention also provides a vending system, comprising: a vendor's database of item information linked to respective selector indicia information; and a computer site configured to load item and selector indicia information from the product vendor's database, the computer site including: a computer having a screen for displaying loaded item and selector indicia information; and a scanner communicating with the computer for scanning displayed selector indicia information shown on the screen and for sending responsive signals to the computer. This may further comprise an Internet website that is accessible to the computer site and that communicates with the vendor's database. As another example, it may comprise a portable memory device having the vendor's database disposed thereon and compatible for use with the computer.

Therefore, from the foregoing, it is a general object of the present invention to provide novel and improved computer operation control methods, item selection and communication methods, product vending and ordering methods, and related product vending systems. Other and further objects, features and advantages of the present invention will be readily apparent to those skilled in the art when the following description of the preferred embodiments is read in conjunction with the accompanying drawings.

BRIEF DESCRIPTION OF THE DRAWINGS

FIG. 1 is a block diagram representing an image displayed on a computer screen and read by a manually used scanner communicating with the computer.

FIG. 2 is a block diagram of a system in which displayed information is obtained locally from a memory of the computer.

FIG. 3 is a block diagram of a system in which displayed information is obtained remotely from another computer.

DETAILED DESCRIPTION OF THE INVENTION

Figure 4:
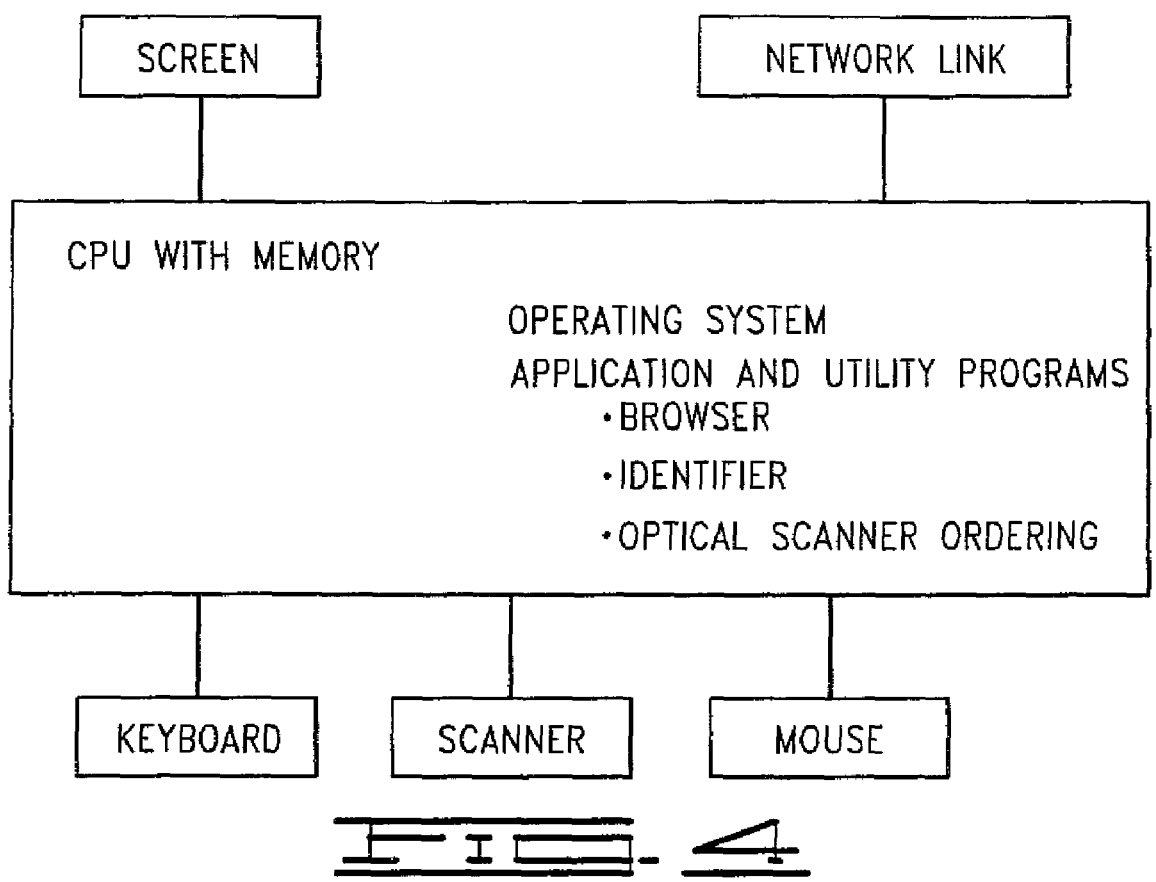
FIG. 4 is a block diagram of a client system that may be used to implement the local computer of the system of FIG. 3.

Referring to FIG. 1, a computer 2 having an operatively associated display screen 4 operates in response to or using signals from a scanner 6 ("or" as used in this specification, including the claims, is inclusive—that is, meaning any or one or more combinations of the listed items—unless otherwise specified). This is one example of equipment that can be used to implement a computer operation control method of the present invention. This method comprises transmitting into a computer a signal in response to an image on a display screen of the computer such that the computer operates in response to the signal. This specifically includes moving a scanner in optical communication with the display screen such that the scanner detects an image displayed on the screen and generates the signal in response.

The image displayed on the screen can be any indicia 8 defining decodable information. Non-limiting examples of the indicia 8 include a bar code (for example, a Uniform Resource Locator image), alphanumeric characters (that is, letters or numbers), and graphic elements. Graphic elements can include, for example, product images or labels or advertisements that, when scanned, are matched with a database to provide information about the products. Thus, in the particular implementations described herein, the indicia 8 to be scanned are selected from the group consisting of a bar code image, an alphanumeric image, and a graphic image.

These indicia 8 are to be detected using suitable scanning equipment such as, for example, a bar code scanner, an optical character recognition scanner, or an optical scanner. In the preferred embodiments of the present invention, these provide optical or laser scanning of the indicia.

Use of the foregoing enables the present invention to provide an item selection communication method. One step of this includes displaying item indicia (for example, a product image) and related scannable identifier indicia (the aforementioned indicia 8) on a screen of a computer. Referring to FIG. 2, these indicia are embodied in signals obtained from a memory 10 of the computer 2 under control of a central processing unit (cpu) 12 of the computer. Another step includes moving a scanner such that the scanner senses the scannable identifier indicia displayed on the computer screen. A further step includes communicating a signal from the scanner to the computer in response to the scanner sensing the scannable identifier indicia. From this, a list of products can be generated in response to communicating the signal from the scanner to the computer. Thus, the signal sent can define information needed to generate an order for the item. The signal can be obtained by manually moving the scanner 6 adjacent the portion of the computer display screen 4 used in displaying the scannable image. In the illustration of FIG. 2, the signal from the scanner 6 can be in any suitable format, whether parallel for communication via a bus 14 of the cpu 12 or serial for communication via a serial port 16 for the cpu 12.

Whereas FIGS. 1 and 2 illustrate use of the present invention with a single computer, FIG. 3 represents use with two (or more) computers. Through this aspect of the present invention, an item can be selected using a client and server system. This includes displaying on a screen 20 of client system 18 information identifying the item and displaying on the screen 20 of the client system 18 a scannable image that is to be used to select the identified item. In response to a user selecting the item by manually optically scanning the displayed scannable image, such as in the same manner for computer 2 of FIGS. 1 and 2, a signal identifying the selected item is sent to a server system 22. The signal sent to the server system 22 preferably defines information needed to generate an order for the item. Displaying in this example of FIG. 3 includes transmitting signals representing the item indicia and related scannable identifier indicia over a network from the server 22 to the client 18, such as over an intranet or local area network or global network (the Internet, for example). From this, a list of items can be generated in response to communicating a signal from the scanner to the client computer and an order generated from the client to the server. Thus, the signal sent to the server system defines information needed to generate an order for the item. The initial item selection signal can be obtained by manually moving the scanner adjacent the portion of the computer display screen used in the client's system in displaying the scannable image.

Whether it includes obtaining the item and identifier indicia locally, such as from a memory in the computer (for example, hard-drive) or one loaded into the computer (for example, CD-ROM or diskette) or via some external source, such as may be connected via local area network or the Internet, for example, the method of selecting an item illustrated in the drawings comprises accessing through operation of a personal computer, at the request of a user of the personal computer, a database of item information. In FIGS. 1 and 2, this database is stored on the local memory 10; and in FIG. 3, it is the represented database 24 stored with or apart from the server computer 26 providing the link to the client computer 18. Non-limiting examples of the database include an inventory control system, a price database, and an order filling database, each which may be of a type as known in the art. It further comprises displaying, through a screen of the personal computer, in response to the accessed database, information for at least one item, including at least one scannable selector image. Such method farther comprises moving a scanner adjacent the screen to optically scan the displayed selector image, generating a signal in response thereto and communicating the signal to the personal computer, thereby selecting the corresponding displayed item.

As mentioned above, accessing the database can include use of the Internet. This can include going via a web browser program stored in the personal computer 2 or 18 to a predetermined website on the Internet, such as provided using the server computer link 26 which communicates with the database 24 of item information. This further includes downloading to the personal computer, via the Internet, from the database of item information, the information for displaying through a screen of the personal computer. Accessing the database can also include other techniques, one of which as mentioned above includes using a local storage device in the personal computer containing the database of item information. Regardless where the item information is stored, a communication to order the selected item can be sent via the Internet to the website for a configuration as illustrated in FIG. 3.

Referring to FIG. 4, the local or client computer 2 or 18 typically includes the components shown in FIGS. 1-3 and reiterated generically in FIG. 4. Within the cpu and its memory, however, are the operating system (for example, Windows, Apple) and application and utility programs needed to perform functions of the present invention and ones as are typical of a personal computer. Any specific programming, such as (without limitation) for receiving and processing signals from the scanner and communicating with local or remote devices (for example, a local monitor or a remote Internet site), can be of types known in the art for particular implementations of the equipment. FIG. 4 shows such programming (including data) including a web browser, the item identifier database and the scanner interface and signal use software (that is, the software needed to generate a selection or order and to communicate that locally or remotely).

Figure 5:
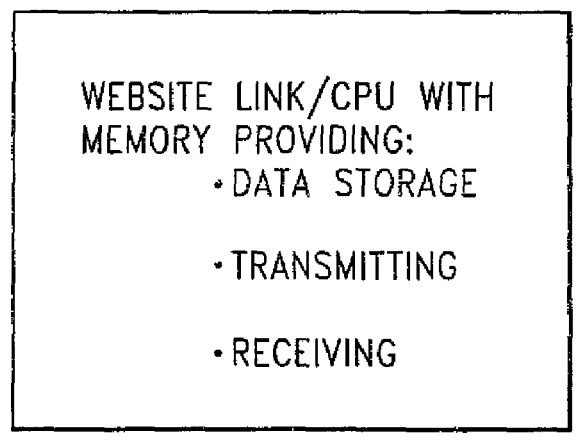
FIG. 5 is a block diagram of a website link that may be used to implement the computer link of the system of FIG. 3.

FIG. 5 represents types of software needed at the server end for an implementation such as illustrated in FIG. 3. This includes data storage, signal transmitting and signal receiving software, all of which can be of types known in the art for particular equipment and functions selected.

Figure 6:
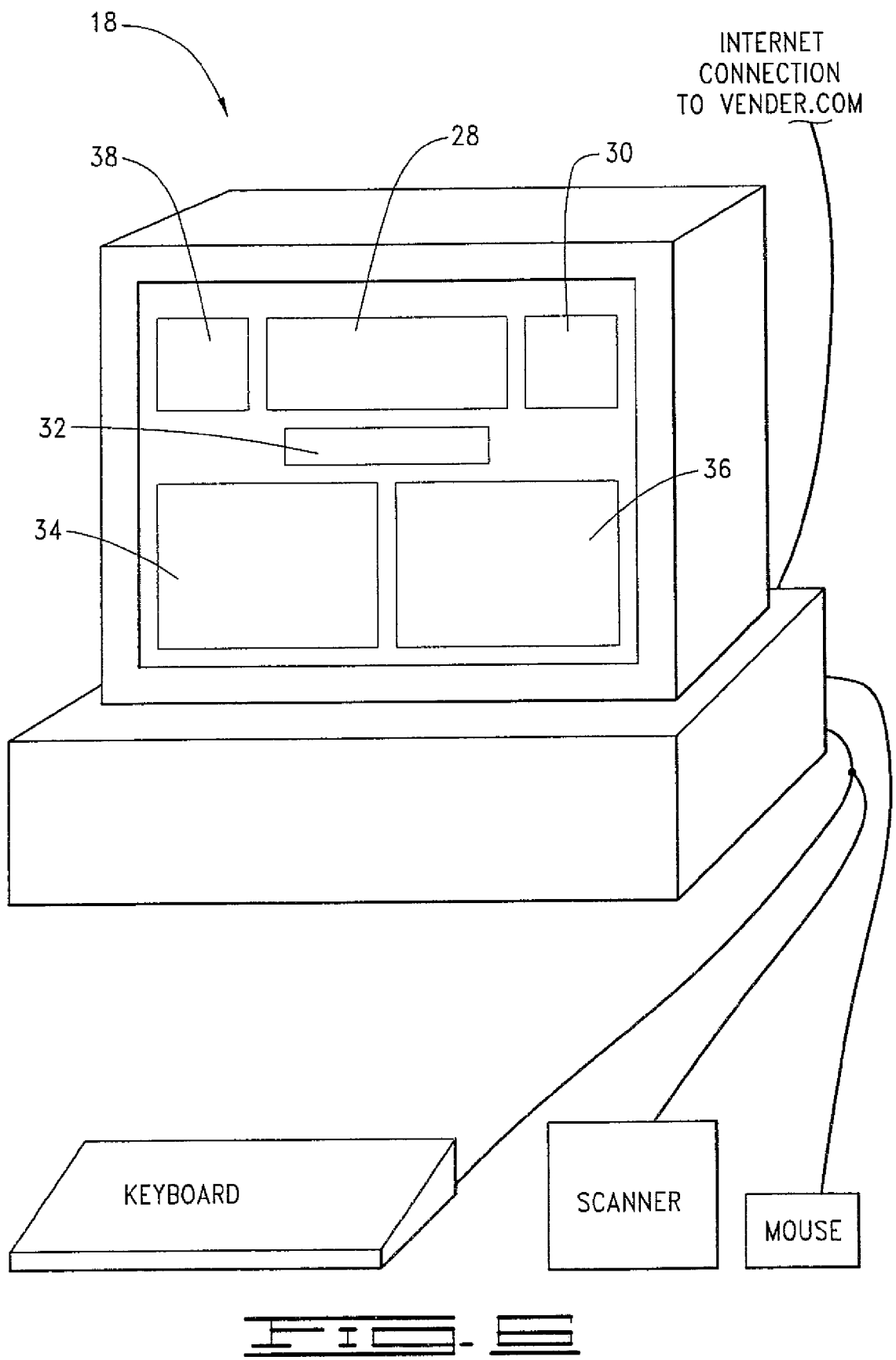
FIG. 6 represents a personal computer configured to provide an interface in accordance with the present invention, wherein one view of an interface display visually replicates looking at an actual in-store view and displays scannable indicia by which products can be ordered.

In view of the foregoing, the present invention as illustrated in FIG. 3, and with a more particular illustration of the personal computer 18 shown in FIG. 6, can also be defined as an item selection communication method, one step of which includes transmitting signals from a first computer (for example, the server 22) to a second computer (for example, the computer 18) and in response generating at the second computer a display showing an image including a visual identifier correlated to a respective item. This method also includes scanning the visual identifier from a locus adjacent to but exteriorly of the second computer (that is, in the illustrated embodiment outside the display device, and thus on the exterior of the computer—as contrasted with interiorly detecting such as via "hot spotting" and detecting cursor location). A further step includes receiving at least at the second computer a signal responsive to the scanning. To facilitate product selection when the item is a product for sale, the display generated in the illustration of FIG. 6 preferably includes some type of view from a store from which the products are actually marketed. This can be a current real time view (that is, a live view), or a pre-recorded earlier view of the store; and one may be a primary view and the other a secondary or back-up view. If it is a pre-recorded view, preferably it has a product layout configuration substantially the same as at the time the display is generated so that the consumer (that is, the user of the local or client computer) sees the configuration substantially as it would be seen if or when the consumer goes to the actual store.

FIG. 6 illustrates the computer 18 as simultaneously displaying on its screen the following: (1) an in-store view 28 visually replicating at least part of a merchandise section in a store having products for sale in merchandise sections across an area of the store, (2) a map view 30 having graphical indicia showing the merchandise sections and their relative locations across the area of the store, (3) movement control indicia 32 enabling a user to change images in the in-store view, (4) a product information view 34 showing a product selected by the user from the in-store view and also showing the scannable identifier that can be scanned to select the item for purchase, and (5) a product selection area 36 identifying products selected for purchase by the user. This may further include product name and price information. This may also include directory indicia 38 identifying locations and product categories viewable within the in-store view. The in-store view 28 may include showing images of products arranged on shelves in aisles. The movement control indicia 32 may enable in the in-store view visually replicating continuous movement forward and back and left and right along the aisles, up and down the shelves in the aisles, and left and right turns at ends of the aisles. In one particular implementation, the in-store view 28 shows images of products and bar code images respectfully associated with the product images. This viewing area preferably can be controlled by the user so that a selected portion of the in-store view is enlarged to ensure that the respective bar code image for a desired product shown in the enlarged portion has a resolution sufficient for the scanner to read.

The in-store images can be live or pre-recorded. As to the latter, one example is that in-store images can be taken (by any suitable means known in the art, one non-limiting example of which includes a digital video camera) while the store is empty or substantially so (that is, there is non-existent or minimal customer presence in the store, such as at night for stores that close or have fewer customers at that time) and stored for use during the next business day or for a given increment of time. This allows an up-to-date database of in-store images without the need to interfere with shoppers' feelings of privacy or usual business activities during regular or busier business hours.

From the foregoing, the present invention can also be defined as a method of selecting an item using a personal computer. This method comprises accessing, at the request of a user of the personal computer, the Internet using a web browser program stored in the personal computer. It also includes going via the web browser program directly to an item vendor's website on the Internet (such as "vendor.com" in FIG. 6). The website communicates with a database of item and bar code information maintained by the item vendor. The item and bar code information includes information representing an actual store environment maintained by the item vendor. Information about at least a portion of the actual store environment and at least one item and its related bar code are downloaded to the personal computer, via the Internet, from the item and bar code information. Images of the portion of the actual store environment, and of at least one item and related bar code where actually located in the portion of the actual store displayed, are displayed through a screen of the personal computer in response to the downloaded information. The method further includes moving a bar code scanner adjacent the outside of the screen to optically scan the displayed bar code image, generating a signal in response thereto and communicating the signal to the personal computer, thereby selecting the corresponding displayed item. This may further comprise sending a communication via the Internet to the website to order the selected item.

The present invention may also be defined as a particular method of placing an order for an item. This particular method comprises, under control of a client system, displaying on a computer of the client system information identifying the item, and sending a request to order the item, including scanning a bar code image displayed on the computer of the client system, wherein the bar code image is related to the item. The method also comprises, under control of a server system, receiving the request and generating an order to purchase the requested item. This can be defined more particularly as a product vending method comprising: displaying on a screen of a computer a portion of a store environment, including showing images of actual products for sale at the store and showing scannable images respectfully associated with the products. This method also comprises changing the portion of the store environment displayed on the screen until an image of an actual product to be selected and the respective scannable image are shown on the screen. This method also comprises optically scanning the scannable image shown on the screen to generate a signal in response thereto, and communicating the signal to the computer. Displaying includes transmitting signals representing the images of actual products and scannable images associated therewith over the Internet to the computer or obtaining signals representing images of actual products and scannable images from a memory of the computer. This method further comprises generating a list of products in response to communicating the signal to the computer. The method can also comprise transmitting a signal from the computer and over the Internet in response to communicating the signal to the computer.

Thus, information handling, as provided by the present invention, can be performed locally via a single computer or in conjunction with one or more other computers. The scanning can communicate information obtained from the screen of one computer to that computer or to a second computer from which a response can be obtained, such as to display on the display screen of the locally used computer for further action by the user.

Referring to the various drawings, the present invention also provides a vending system. This comprises a vendor's database (for example in the memory 10 of FIG. 2 or database 24 of FIG. 3) of item information linked to respective selector indicia information. The system also comprises a computer site configured to load item and selector indicia information from the vendor's database. The computer site includes: a computer having a screen for displaying loaded item and selector indicia information; and a scanner communicating with the computer for scanning displayed selector indicia information shown on the screen and for sending responsive signals to the computer. The foregoing can further comprise an Internet website accessible to the computer site and communicating with the vendor's database. Alternatively or additionally, it can further comprise a portable memory device having the vendor's database disposed on it and compatible for use with the computer.

EXAMPLES

Indicia

Code 39 is a standard bar code in a non-food area. Code 128 is an alternative bar code which has extra character capability.

Computer Screen Settings

Code 39 and code 128 bar codes were read at 800×600 pixels and 1024×768 pixels computer screen resolution settings of a 12-inches×9-inches (30.5 centimeters×22.9 centimeters) display screen; however, in general, settings and image size should be selected to be compatible with the capability of the selected scanner (that is, the capability of the scanner is determinative).

In-Store View

TrueLook software is available from Perceptual Robotics, Inc. This software can provide live or recent multiple camera views of a commercial environment. It has the zoom capability to view bar codes of sufficient size to be scanned by this basic equipment. The TrueLook software uses a network of cameras that allows the user to manipulate and explore the on-screen display of live or past pictures of a real setting.

Test Data

Scanner: Alpha 22 Scanner made by Zebex Industries, Inc.
Computer screen: Professional Series PT771 ViewSonic having screen size of 12 inches by 9 inches (30.5 centimeters×22.9 centimeters)
Computer: Dell Optiplex GX1, 450 MHz (includes PS2 keyboard connector through which scanner communicates); Windows NT (version 4.0, service pack 6.0)

| Pixel Setting | Code Low Density | Display Size (length & height of bar) | Result |
|---|---|---|---|
| 800 × 600 | 39 | $2^{12}/_{32}$" × $18/_{32}$" (6.0 cm × 1.4 cm) | Read |
| 800 × 600 | 128 | $2^{12}/_{32}$" × $18/_{32}$" (6.0 cm × 1.4 cm) | Read |
| 1024 × 768 | 39 | $1^{26}/_{32}$" × $14/_{32}$" (4.6 cm × 1.1 cm) | Read |
| 1024 × 768 | 128 | $1^{26}/_{32}$" × $14/_{32}$" (4.6 cm × 1.1 cm) | Read |
| 1280 × 1024 | 39 | — | No Reads |
| 1280 × 1024 | 128 | — | No Reads |

The standard code 39 and code 128 low density bar codes were printed on conventional white printer paper. The printed version was reduced such that the code 39 low density setting bar length was $23/_{32}$ inch (1.8 centimeters) with a height of $6/_{32}$ inch (0.5 centimeter); the scanner read this from the piece of paper. The code 128 was read at a bar length of $20/_{32}$ inch (1.6 centimeters) with a height of $6/_{32}$ inch (0.5 centimeter). It is anticipated that the scanner would read codes of this size on the screen, but no tests were run for that small size on the computer screen.

Thus, the present invention is well adapted to carry out the objects and attain the ends and advantages mentioned above as well as those inherent therein. While preferred embodiments of the invention have been described for the purpose of this disclosure, changes in the construction and arrangement of parts and the performance of steps can be made by those skilled in the art, which changes are encompassed within the spirit of this invention as defined by the appended claims.

What is claimed is:

1. An item selection communication method, comprising:
    displaying an image on a computer screen, said displayed image including image indicia defining decodable information;
    scanning said image indicia defining decodable information by detecting said image and comparing said image with a data basis of images;
    generating a signal containing said indicia defining decodable information;
    communicating said signal to a computer associated with said computer screen in response to the selection of identifier indicia, thereby generating a list of at least one item associated with said displayed image and selecting said item.

2. The method of claim 1, wherein the display of the image on the computer screen includes a portion of a store environment, including showing images of actual products for sale at the store and showing images respectively associated with the products and further including the step of changing the portion of the store environment displayed on the screen until an image of an actual product to be selected is shown on the screen.

3. The method of claim 2, wherein the step of displaying includes transmitting signals representing the images of actual products over the Internet to the computer.

4. The method of claim 2, wherein the step of displaying includes obtaining signals representing the images of actual products from a memory of the computer.

5. The method of claim 2, wherein the step of changing the portion of the store environment displayed includes transmitting signals representative of real time images in a store environment.

6. The method of claim 2, further comprising the step of recording in-store images during a period of nonexistence or minimal customer presence.

7. An item selection communication method, comprising:
    displaying an image on a computer screen, said displayed image including image indicia defining decodable information;
    scanning said image indicia defining decodable information by detecting said image and comparing that image with the data basis of images;
    generating a signal containing said indicia defining decodable information;
    communicating said signal to a second computer in response to the selection of identifier indicia, thereby generating an order for the selected item.

8. The method of claim 7, wherein the display of the image on the computer screen includes a portion of a store environment, including showing images of actual products for sale at the store and showing images respectively associated with the products and further including the step of changing the portion of the store environment displayed on the screen until an image of an actual product to be selected is shown on the screen.

9. The method of claim 8, wherein the step of displaying includes transmitting signals representing the images of actual products over the Internet to the computer.

10. The method of claim 8, wherein the step of displaying includes obtaining signals representing the images of actual products from a memory of the computer.

11. The method of claim 8, wherein the step of changing the portion of the store environment displayed includes transmitting signals representative of real time images in a store environment.

12. The method of claim 8, further comprising the step of recording in-store images during a period of nonexistence or minimal customer presence.

* * * * *